(12) United States Patent
Woo

(10) Patent No.: US 10,304,458 B1
(45) Date of Patent: May 28, 2019

(54) SYSTEMS AND METHODS FOR TRANSCRIBING VIDEOS USING SPEAKER IDENTIFICATION

(71) Applicant: Daniel Newton Woo, Huntsville, AL (US)

(72) Inventor: Daniel Newton Woo, Huntsville, AL (US)

(73) Assignee: Board of Trustees of the University of Alabama and the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 14/641,205

(22) Filed: Mar. 6, 2015

Related U.S. Application Data

(60) Provisional application No. 61/948,985, filed on Mar. 6, 2014.

(51) Int. Cl.

| | |
|---|---|
| *G10L 17/06* | (2013.01) |
| *G10L 17/10* | (2013.01) |
| *G10L 15/26* | (2006.01) |
| *G10L 15/25* | (2013.01) |
| *G10L 17/02* | (2013.01) |
| *H04N 21/44* | (2011.01) |
| *H04N 21/439* | (2011.01) |
| *H04N 21/488* | (2011.01) |
| *H04N 21/81* | (2011.01) |
| *H04N 5/445* | (2011.01) |

(52) U.S. Cl.
CPC .............. *G10L 15/26* (2013.01); *G10L 15/25* (2013.01); *G10L 17/02* (2013.01); *G10L 17/10* (2013.01); *H04N 21/4394* (2013.01); *H04N 21/44008* (2013.01); *H04N 21/4884* (2013.01); *H04N 21/812* (2013.01); *G10L 17/06* (2013.01); *H04N 2005/4453* (2013.01)

(58) Field of Classification Search
CPC ......... G10L 17/00; G10L 17/06; G10L 17/10; G06K 9/325; G06K 9/00221; H04N 2005/4453
USPC ................... 704/235, 246; 348/468; 382/118
See application file for complete search history.

(56) References Cited

U.S. PATENT DOCUMENTS

| | | | |
|---|---|---|---|
| 6,219,640 B1 * | 4/2001 | Basu .................. | G06K 9/00221 704/231 |
| 6,377,995 B2 | 4/2002 | Agraharan et al. | |

(Continued)

OTHER PUBLICATIONS

Hong, Richang, et al. "Dynamic captioning: video accessibility enhancement for hearing impairment." Proceedings of the 18th ACM international conference on Multimedia. ACM, Oct. 2010, pp. 421-430.*

(Continued)

*Primary Examiner* — James Wozniak
(74) *Attorney, Agent, or Firm* — Maynard Cooper & Gale, P.C.; Jon E. Holland

(57) ABSTRACT

A system and method for summarizing video feeds correlated to identified speakers. A transcriber system includes multiple types of reasoning logic for identifying specific speakers contained in the video feed. Each type of reasoning logic is stored in memory and may be combined and configurable to provide an aggregated speaker identification result useful for full or summarized transcription before transmission across a network for display on a network-accessible device.

24 Claims, 3 Drawing Sheets

(56) References Cited

U.S. PATENT DOCUMENTS

| | | | |
|---|---|---|---|
| 6,421,645 B1 | 7/2002 | Beigi et al. | |
| 6,567,775 B1* | 5/2003 | Maali | G06K 9/6293 |
| | | | 704/231 |
| 6,714,909 B1* | 3/2004 | Gibbon | G06F 17/30787 |
| | | | 704/246 |
| 6,754,631 B1* | 6/2004 | Din | G10L 17/00 |
| | | | 704/270 |
| 6,925,197 B2* | 8/2005 | Dimitrova | G06F 17/30793 |
| | | | 348/61 |
| 7,171,360 B2 | 1/2007 | Huang et al. | |
| 7,219,062 B2 | 5/2007 | Koninklijke et al. | |
| 7,403,224 B2 | 7/2008 | Fuller et al. | |
| 7,920,761 B2 | 4/2011 | Amir et al. | |
| 8,024,189 B2* | 9/2011 | Zhang | G06K 9/4614 |
| | | | 382/116 |
| 8,078,463 B2 | 12/2011 | Wasserblat et al. | |
| 8,204,884 B2 | 6/2012 | Freedman et al. | |
| 8,488,916 B2* | 7/2013 | Terman | G09B 5/08 |
| | | | 382/187 |
| 8,528,018 B2 | 9/2013 | Patil et al. | |
| 8,537,978 B2* | 9/2013 | Jaiswal | G10L 17/005 |
| | | | 379/265.07 |
| 8,593,501 B1* | 11/2013 | Kjeldaas | H04N 7/15 |
| | | | 348/14.01 |
| 2002/0135618 A1* | 9/2002 | Maes | G06F 3/0481 |
| | | | 715/767 |
| 2004/0093220 A1* | 5/2004 | Kirby | G06F 17/27 |
| | | | 704/278 |
| 2007/0011012 A1* | 1/2007 | Yurick | G10L 15/26 |
| | | | 704/277 |
| 2007/0106724 A1* | 5/2007 | Gorti | G06Q 10/10 |
| | | | 709/204 |
| 2007/0118374 A1* | 5/2007 | Wise | G10L 15/26 |
| | | | 704/235 |
| 2007/0133437 A1 | 6/2007 | Wengrovitz et al. | |
| 2008/0052069 A1* | 2/2008 | Flanagan | G06F 17/289 |
| | | | 704/235 |
| 2008/0292279 A1 | 11/2008 | Kamado et al. | |
| 2008/0300872 A1* | 12/2008 | Basu | G06F 17/30017 |
| | | | 704/235 |
| 2009/0204399 A1* | 8/2009 | Akamine | G10L 15/1822 |
| | | | 704/235 |
| 2010/0042412 A1* | 2/2010 | Aronowitz | G10L 15/1822 |
| | | | 704/270 |
| 2010/0067745 A1* | 3/2010 | Kovtun | G06K 9/00711 |
| | | | 382/106 |
| 2010/0100376 A1* | 4/2010 | Harrington | G10L 15/26 |
| | | | 704/235 |
| 2011/0145002 A1* | 6/2011 | Melamed | G10L 25/48 |
| | | | 704/278 |
| 2011/0246172 A1* | 10/2011 | Liberman | G06F 17/289 |
| | | | 704/2 |
| 2011/0273553 A1 | 11/2011 | Spatharis et al. | |
| 2012/0084087 A1 | 4/2012 | Yang et al. | |
| 2012/0117078 A1 | 5/2012 | Morton et al. | |
| 2012/0133638 A1* | 5/2012 | Davison | G06T 17/00 |
| | | | 345/419 |
| 2012/0197630 A1* | 8/2012 | Lyons | G06F 17/30719 |
| | | | 704/9 |
| 2013/0124984 A1* | 5/2013 | Kuspa | H04N 9/475 |
| | | | 715/255 |
| 2013/0144603 A1 | 6/2013 | Lord et al. | |
| 2013/0154084 A1 | 6/2013 | Kadoguchi et al. | |
| 2013/0166295 A1 | 6/2013 | Shriberg et al. | |
| 2013/0201272 A1 | 8/2013 | Enbom et al. | |
| 2013/0271361 A1 | 10/2013 | Velvsamy et al. | |
| 2014/0016835 A1* | 1/2014 | Song | G10L 17/06 |
| | | | 382/118 |

OTHER PUBLICATIONS

Erzin, et al. "Multimodal speaker identification using an adaptive classifier cascade based on modality reliability." IEEE Transactions on Multimedia 7.5 (2005), Oct. 2005, pp. 840-852.*

Busso, Carlos, et al. "Real-time monitoring of participants' interaction in a meeting using audio-visual sensors." Acoustics, Speech and Signal Processing, 2007. ICASSP 2007. IEEE International Conference on. vol. 2. IEEE, Jun. 2007, pp. 685-688.*

Yang, et al., "Multiple Instance Learning for Labeling Faces in Broadcasting News Video," ACM 2005, pp. 1-10.

Cutler, et al., "Look Who's Talking: Speaker Detection Using Video and Audio Correlation," Institute for Advanced Computer Studies, University of Maryland, College Park, pp. 1-5.

Satoh, et al., "Naming and Detecting Faces in Video by the Integration of Image and Natural Language Processing," School of Computer Science, Carnegie Mellon University, Proceedings of IJCAI-97, pp. 1488-1493, 1997.

* cited by examiner

400

Facial, OSE List

| Connected Poses | Similar Faces |
|---|---|
| 40, 56 | Face 1 |
| 56, 50 | Face 1 |
| 50, <u>24</u> | Face 1 |
| 12, 15 | Face 2 |
| 15, 7 | Face 2 |
| <u>7</u>, 48 | Face 2 |
| 33 | Face 3 |

*FIG. 4*

SYSTEMS AND METHODS FOR TRANSCRIBING VIDEOS USING SPEAKER IDENTIFICATION

CROSS REFERENCE TO RELATED APPLICATION

This application claims priority to U.S. Provisional Application No. 61/948,985, entitled "Systems and Methods for Transcribing Videos" and filed on Mar. 6, 2014, which is incorporated herein by reference.

RELATED ART

Internet and television producers are sources of vast amounts of informative video feeds or imagery that may be used in multiple ways to fully inform and educate viewers. Closed captioning is a process by which speech for a video feed is transcribed into text, which is then encoded within the video feed. Closed captioning is often used to assist hearing-impaired viewers in understanding speech uttered in the video. In this regard, a receiver of the video feed is configured to decode the video feed in order to recover the text and to then display the text while video is being rendered to a viewer. Thus, a viewer incapable of hearing the speech from the video can still follow and understand such speech by reading the closed-captioned text that is displayed within the video.

However, when conventional methods of transcribing speech within a video are employed, a great deal of information may be absent from or unrevealed in the conventional transcription. For example, when video images depict multiple speakers having a discussion in a video stream, the content of the discussion may be correctly captured by transcription for closed captioning, but not the identity of the speaker producing a portion of the conversation. Notably, many conventional closed captioning methods merely mark speaker transitions with a recognizable prompt or symbol, such as ">>". Thus, a viewer of a particular transmitted video feed who is forced to discern the conversation via closed captions alone, because of a hearing impairment or otherwise, may become confused about which transcribed statement, opinion, speculation, etc. should be properly attributed to which speaker in the video. As a result, the full meaning of the discussion may be lost to a viewer that has to depend on a transcription of the conversation between multiple speakers.

Television broadcasting includes numerous video feeds of news-related information drawn from interviews with newsworthy individuals. Often the video feeds depict video images of multiple speakers who are speaking during the course of an interview, debate, or other discussion. In many cases, it may be desirable to produce and store written transcripts of these televised discussions for archival purposes. Thus, a person can search a database of archived transcripts to find a transcript of interest relating to a previously-broadcasted video.

Unfortunately, it can be particularly problematic for a reader of an archived transcript to comprehend the transcribed discussions and, specifically, to attribute statements in the written transcript to the correct speaker. For example, a person subjected to only reading a transcript of a conversation in a video cannot rely on visual cues that a viewer of the video easily has at his disposal in order to assess the likely speaker for a transcribed statement.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 4 is an example list of connected facial poses constructed by the system in FIG. 2.

DETAILED DESCRIPTION

Figure 1:
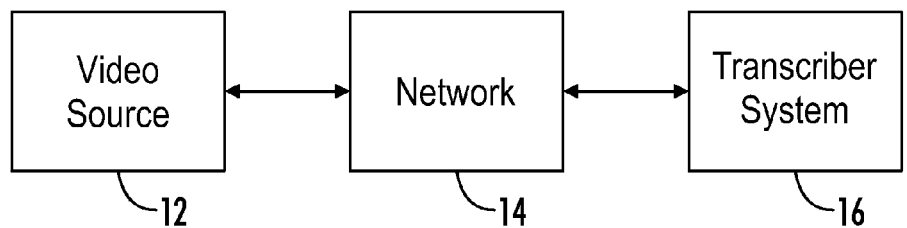
FIG. 1 is a block diagram illustrating an exemplary embodiment of a system for providing and transcribing video feeds.

The present disclosure generally pertains to systems and methods for transcribing videos. In one exemplary embodiment, a system for transcribing videos is configured to decode and extract video and audio content from video feeds, such as television broadcasts, in order to produce textual content of speech from the video feeds. In some cases, the textual content encoded with the video content as closed captioned text. The system analyzes the video and audio content in order to identify speakers and to automatically correlate each speaker to the speech segments that are attributable to him. That is, the system determines which speaker spoke a given speech segment, such as one or more sentences or phrases, from the video feed and then marks the speech segment with the identity of the speaker. Thus, the system produces a written transcript that indicates the speech defined by the audio content within a video feed and also indicates which speaker is deemed to have spoken each speech segment. Thus, a person reading the transcript can easily follow a conversation among multiple speakers in the video feed and readily understand the full meaning of the conversation.

The system may glean or extract the identity of the speakers using any of several different techniques, including but not limited to the use of artificial intelligence, rule-based algorithms, statistical algorithms, and machine learning. Machine learning, generally refers to a branch of artificial intelligence that involves the construction and study of systems that can learn from data. Artificial intelligence generally refers to intelligence exhibited by machines or software, and the development of machines and software with intelligence. Rule-based algorithms, also known as "association rules," generally refer to human-created algorithms for automatically discovering interesting relations among variables in a large dataset via programming. Statistical algorithms, on the other hand, use classification for determining to which category a data point belongs. Whereas classification is a supervised procedure associated with training sets of data, clustering can be considered an unsupervised procedure that involves grouping data into categories based on some measure of inherent similarity.

In one exemplary embodiment, the system is configured to summarize the speech defined by the audio content of a video feed. That is, rather than providing a complete transcript of a conversation in the video feed, the system selectively removes some speech from the transcript in an effort to provide a condensed version of a conversation. In some cases, the system uses the identities of the speakers for selecting various portions of the speech to be culled. As an example, the system may remove various speech segments such that the total percentage of content attributable to each speaker in the condensed version is about the same as in the full version of the conversation (e.g., within specified margin of error). Alternatively, the system may give priority to one or more speakers during the summarization by culling content so that the total percentage of content attributable to one or more speakers in the condensed version is increased (and the total percentage of content attributable to one or more other users is decreased).

FIG. 1 depicts an exemplary embodiment of a system 10 that includes a video source 12 communicatively coupled to a network 14. The video source 12 may contain video imagery in multiple formats, including industry standards MPEG 2, MPEG 4, and H. 264, for example. These standard-based video formats are well known in the multimedia industry and will not be described further herein. In one example embodiment, a satellite feed may provide video files to a video server. The satellite feed may be provided by a satellite network provider that is capable of transmitting recorded and live video programming to a viewing audience per the guidelines of the Federal Communication Commission (FCC) or other regulatory communication/media agency. Alternatively, a cable network may also provide or transmit the video feed. In addition to the video imagery, the video feed is encoded with textual data that reflects speech of speakers within the video feed, such as a conversation between multiple speakers or speech from a single speaker. As an example, such textual data may be closed captioning text that is displayed along with the video imagery to assist viewers in comprehending the speech as the video imagery is being rendered. The closed-caption text may be generated per the guidelines of the FCC and may be generated manually by a person transcribing a conversation that is being recorded. The closed-caption text may also be generated automatically using voice recognition or other technology for automatically transcribing speech.

The network 14 may be any type of network for communicating data, such as a local area network (LAN) or a wide area network (WAN). As an example, the network 14 may be a cable network for broadcasting television signals to viewers dispersed across a large geographic area. In one exemplary embodiment, the network comprises the Internet, which streams the video feed to any number of users. As an example, the video source 12 may comprise a server that is accessed through the Internet in order to download the video feed for viewing by a user. The network 14 may operate via any of a variety of communication protocols to connect with a network interface (as shown in FIG. 2), including transmission control protocol/Internet protocol (TCP/IP), Ethernet, I.E.E.E. 802.11a, I.E.E.E. 802.11b, I.E.E.E. 802.11g, and I.E.E.E. 802.11n, for example.

The network 14 is also communicatively coupled to a transcriber system 16, as shown in FIG. 1. The transcriber system 16 transcribes video feeds from the video source 12, thereby producing textual content related to speech spoken within the video feeds. The transcriber system 16 is configured to decode or extract video data and audio data from the video feeds in order to have the video and audio data processed by a combination of algorithms that will produce identification speech segments and identification of speakers within a given speech segment. Each algorithm has an inherent confidence value associated with it regarding the amount of accuracy about identifying the correct speaker within a video frame.

Note that the transcriber system 16 may be implemented as a server on a network or may be implemented as any other type of computer-based system. As an example, the transcriber system 16 may be implemented using one or more computers, such as a desktop or laptop computer, a mobile device, such as a tablet computer or smartphone, or any other device capable of receiving and processing data.

Figure 2:
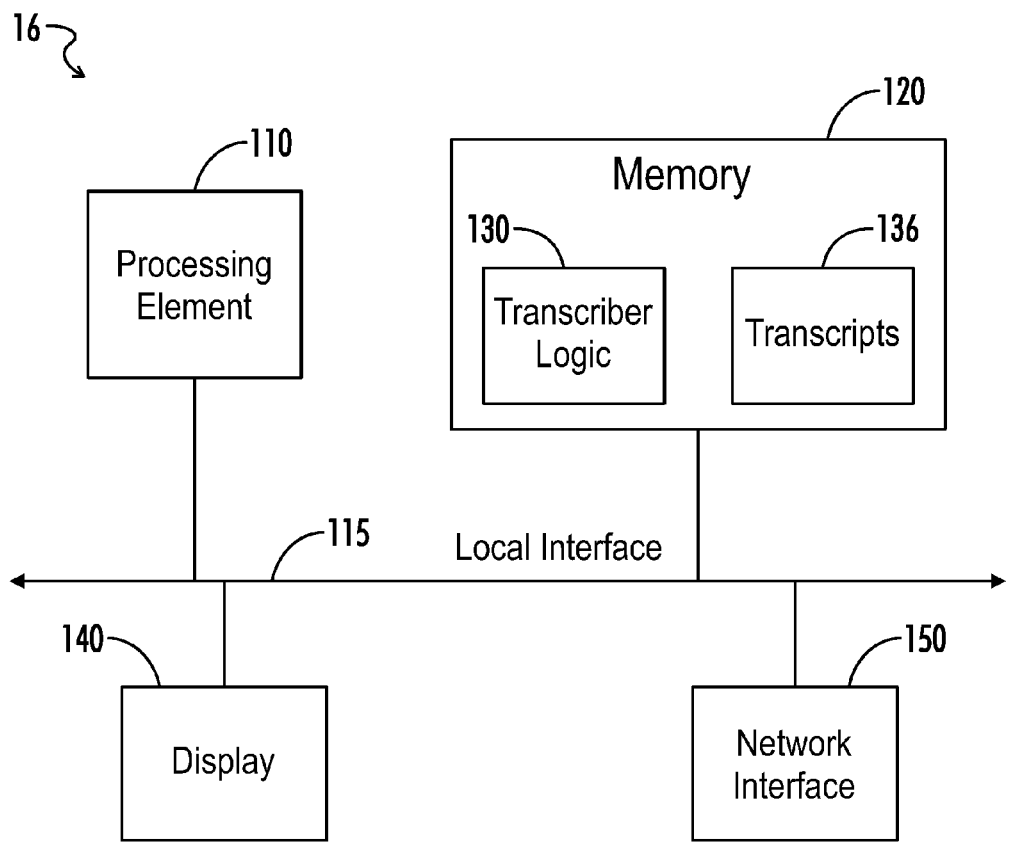
FIG. 2 is a block diagram illustrating an exemplary transcriber system shown in FIG. 1.

FIG. 2 depicts an exemplary embodiment of a transcriber system 16. As shown by FIG. 2, the transcriber system 16 comprises a processing element 110 for executing instructions of software or firmware of the system 16. The processing element 110 is configured to drive various components in the transcriber system 16 via a local interface 115, which include at least one bus. Local interface 115 is also communicatively coupled with memory 120. The memory 120 can be any type of data storage component including, a server, a database, a flashdrive, random access memory (RAM), random only memory (ROM), for example. The memory 120 stores transcripts 136 of speech from video feeds. In this regard, each transcript is a textual representation of speech from at least one video feed. The transcriber system 16 also has a network interface 150, such as a modem, for communicating with the network 14 (FIG. 1).

As shown by FIG. 2, the transcriber system 16 comprises transcriber logic 130 for generally controlling the operation of the system 16, as will be described in more detail hereafter. The transcriber logic 130 may be implemented in hardware, software, firmware, or any combination thereof. In one example embodiment, the transcriber logic 130 is implemented in software and stored in memory 120.

The transcriber logic 130, when implemented in software, can be stored and transported on any computer-readable medium for use by or in connection with an instruction execution apparatus that can fetch and execute instructions. In the context of this document, a "computer-readable medium" can be any means that can contain or store code for use by or in connection with the instruction execution apparatus.

The transcriber logic 130 is configured to generate and store the transcripts 136 based on video files received from the video source 12 or other system component. The video source 12 may be a video server, for example, configured to stream a video file over the network 14 to the network interface 150. The video file may be stored in a digital video recorder (e.g., DVR), which can record and store video files according to various industry formats, such as MPEG 2 and MPEG 4 file formats, for example. The transcriber logic 130 may access the video file from the DVR or other storage device and use the video file to generate a transcript 136, which can then be displayed via the display 140 for viewing by a user. Alternatively, the transcript 136 may be transmitted via the network 14 or otherwise to another location for viewing.

In one exemplary embodiment, the transcriber logic 130 is configured to summarize full transcriptions in a manner that the summarized version of the transcript includes approximately the same percentage of each speaker's spoken word contribution as that found in the full transcription. For example, the transcriber logic 130 produces the summarization of multiple speakers' contributions, based on predetermined percentages of each speaker's spoken contributions that are correlated to the full transcript. In one illustrative example, speakers A, B, and C spoke respectively 50%, 20%, and 30% of the speech within the video feed. The transcriber logic 130 captures a portion of the full textual content, yet retains the percentage break down of each speaker's spoken contribution as it is reflected in a substantially full transcription that captures nearly the entirety of the conversation uttered by the speakers. The transcriber logic 130 then summarizes the transcription by removing portions of the speech. In one embodiment, the transcriber logic 136 selects portions to be removed such that the overall amount of speech attributable to each speaker is about the same (within a predefined margin) in the summarized version. Thus, in the instant example, the amount of contribution of speakers A, B, and C in the summarized version should remain about 50%, 20%, and 30%, respectively. However, in another exemplary embodiment no proportional relationship to the contribution of the speakers is necessitated for summarization. Thus, in a one-to-one interview although one speaker (i.e., the interviewer) may dominate the conversation, the summarization may reflect primarily the other speaker's (interviewee) contribution to the conversation.

In operation, the transcriber logic 30 is configured to receive a video feed, which includes video data (e.g., video stream) that is encoded with audio data and textual data, such as closed captions. As an example, the transcriber logic 30 may receive via the network 14 a television signal from a television station or a video streaming signal from an Internet-based server. Note that when the video feed is rendered for viewing by a user, the video data is displayed and the audio data is converted to sound by a speaker. Further, the textual data may be displayed within the video image to assist viewers in discerning speech that is defined by the audio data. Specifically, the textual data defines the speech that is heard by a viewer when the video feed is being rendered. Thus, if the viewer is unable to hear the rendered audio data, the viewer can still discern the speech of speakers within the video feed by reading the textual data. In other embodiments, the presence of textual data within the video feed is unnecessary. As an example, the video data may be encoded with or otherwise associated with the audio data, which is converted into textual data via voice recognition or other types of algorithms by the transcriber logic 130.

In the instant embodiment, the transcriber logic 30 is configured to decode the video feed in order to recover the textual data, which defines a textual representation of the speech in the video feed. The transcriber logic 30 is further configured to store a modified version of the textual data in memory 120 as a transcript 136 of a conversation that is within the video feed. In this regard, as will be described in more detail hereafter, the transcriber logic 130 is configured to analyze data from the video feed in order to attribute speech segments to speakers and to correlate each speech segment in the transcript 136 with the identity (e.g., name) of a respective speaker who the logic 130 deems to have spoken the speech segment. As an example, within the transcript 136, the logic 130 may mark a given speech segment with the name or other identifier of the speaker deemed to have spoken the speech segment so that a person reading the transcript 136 can attribute the speech segment to the appropriate speaker.

Note that there are various techniques that can be used to identify the speaker of a given speech segment. In one exemplary embodiment, the transcriber logic 130 is configured to analyze the audio data using a voice recognition algorithm to identify the speaker of a given speech segment. The transcriber logic 130 is also configured to analyze the video data using a facial recognition algorithm to recognize faces. If the logic 130 identifies just one face in the images during the time period for a given speech segment, then the logic 130 may be configured to determine that the identified face is that of the speaker. If multiple faces are detected in the video image, the logic 130 may determine that the largest face is that of the speaker. Alternatively, the logic 130 may analyze each detected face by processing a predetermined amount of video frames to identify the face that has the greatest degree of mouth movement during the foregoing time period and determine that this identified face is that of the speaker. In one exemplary embodiment, the transcriber logic processes the video frames every M-frames, where M=5. However in other embodiments, M may be less than or greater than 5. The transcriber logic 130 also analyzes the video images using an optical character recognition (OCR) algorithm to determine if a name is displayed within the images. If so, the transcriber logic 130 may be configured to attribute the speech segment to the speaker having this displayed name. Details of example algorithms for identifying a speaker of a give speech segments will be further described below.

In one exemplary embodiment, the transcriber logic 130 uses multiple algorithms (e.g., facial recognition, voice recognition, OCR, etc.) for identifying a speaker of a given speech segment, referred to hereafter generally as "identification algorithms") and then analyzes the results to determine which algorithm most likely provided an accurate result. The transcriber logic 130 then attributes the speech segment to the speaker identified by such algorithm. As an example, in performing each identification algorithm for a given speech segment, the transcriber logic 130 is configured to assign a confidence value to the respective algorithm indicating the probability that the algorithm is providing an accurate result.

For example, facial recognition algorithms generally operate by comparing an unknown face in a video image to a facial template of a known user. If the facial features (e.g., eyes, skin tone, etc.) of the unknown face sufficiently match those of the template, the algorithm determines the identity of the unknown face to be that of the template. A specific facial data structure (not shown) comprises the above described facial features along with others that can aid in identifying and comparing one face with another or with several other faces, simultaneously. In general, a higher degree of similarity between the compared facial features results in a higher confidence of the identification. In the instant embodiment, the transcriber logic 130 is configured to assign a higher confidence value to the facial recognition algorithm when there is a higher degree of similarity between the identified face and its corresponding template. Using similar techniques or other techniques known in the art, the transcriber logic 130 may be configured to determine confidence values for any of the identification algorithms.

The transcriber logic 130 is configured to compare the confidence values of the identification algorithms and to select the identification algorithm that is associated with the confidence value indicating the greatest confidence. The logic 130 then correlates the speaker identified by this selected algorithm with the speech segment. Note that other techniques for selecting the speaker to correlate with the speech segment are possible. As an example, if multiple identification algorithms identify the same speaker, then the transcriber logic 130 may be configured to select this speaker even though a different speaker may be indicated by the identification algorithm having the highest confidence value. Any algorithm based on the confidence values or otherwise may be used to select the speaker to which a given speech segment is to be attributed.

After defining the transcript 136 and attributing each speech segment to a respective speaker, the transcriber logic 130 is configured to store the transcript 136, which subsequently can be searched and read by a user. As an example, a large number of transcripts 136 processed by the transcriber logic 130 may be stored in a database or other form of memory so that a user can search the transcripts for one of interest to view. In an effort to reduce the quantity of content that is stored, searched, or displayed, the transcriber logic 130 is configured to summarize the transcripts by removing at least some text. In one example embodiment, the transcriber logic 130 is configured to select text to be removed based on the identities of the speakers correlated with the speech segments. As an example, the transcriber logic 130 may be configured to remove text such that the overall percentage of text in the transcript 136 attributed to a given speaker remains approximately the same after the summarization.

Example techniques for processing a video file (e.g., from a video feed received from the network 14) and determining the identities of speakers for the speech segments will now be described in more detail below. Note, the transcriber system 16 processes information or data from multiple sources in order to determine a calculated guess regarding the identity of a particular speaker at a certain speaker transition point in the closed caption, indicated by the prompt ">>", for example, or another discernable speech segment indicator. The transcriber system 16 produces a confidence value based on combining historical accuracy with current conditions. In one example, a machine learning algorithm that uses a weighted majority voting results in a "best guess" for identifying the speaker, which is a probabilistic approach. However, other machine learning algorithms may also be used to identify the correct speaker. These other machine learning algorithms may include neural nets and Bayesian probability techniques. In one embodiment, the accuracy of the "best guess" is at least 64-75%, but other accuracies are possible in other embodiments.

Figure 3:
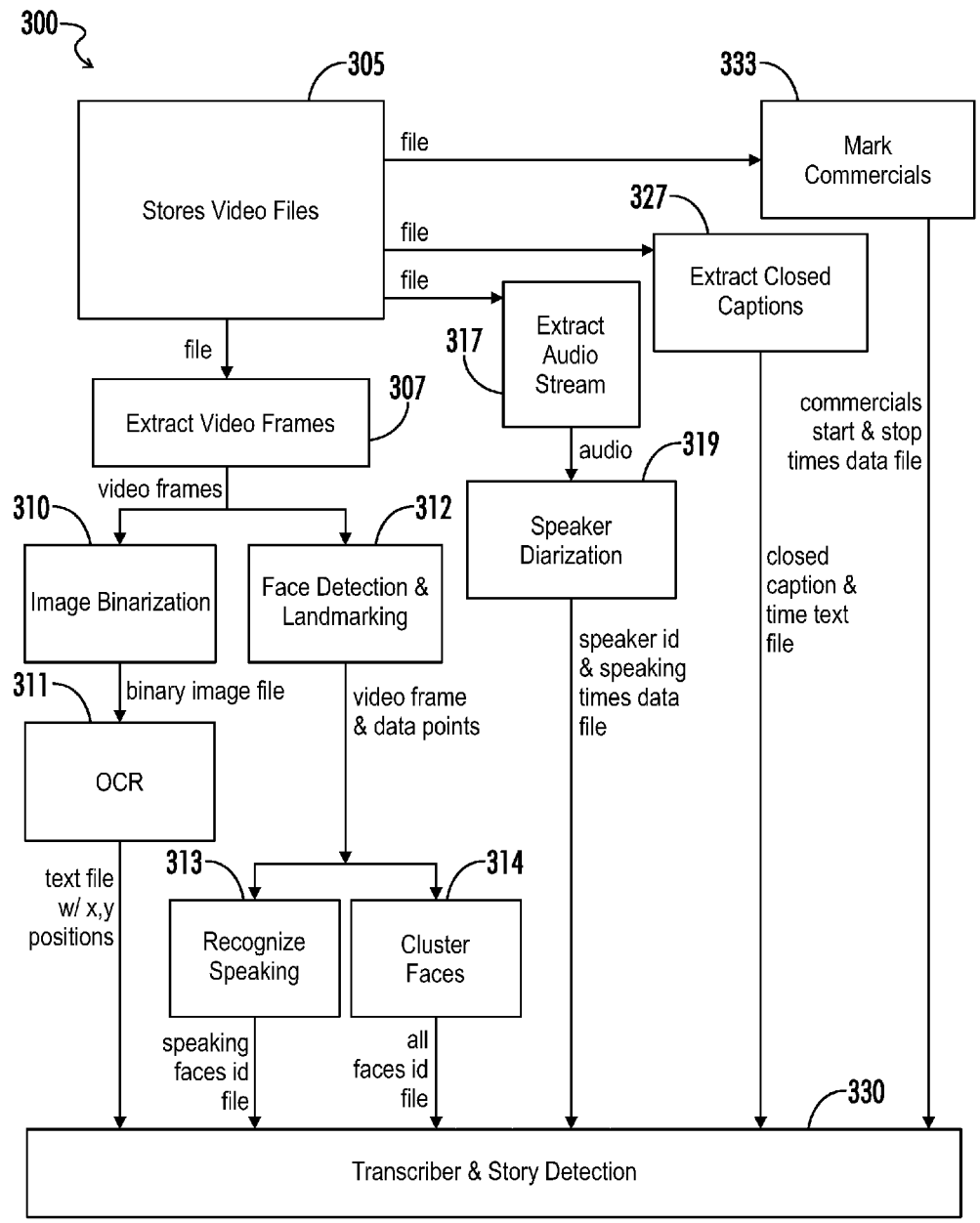
FIG. 3 is a block diagram illustrating example speaker identification methods for a transcriber system, such as is depicted by FIG. 2.

Referring to FIG. 3, a data flow diagram 300 illustratively depicts example sources of data for the transcriber logic 130 to use in order to process video files from video source 12 for identifying speakers and subsequent correlation to speech segments occurring within the video. In one embodiment, a DVR contains stored video files, as shown in block 305. In another embodiment, a database, a server or archival video system may store the video files. The video files may have different compression formats and resolution schemes, such as standard definition video or high definition video, as is known in the art. In addition, the video files may be stored as MPEG encoded data stream files (i.e., MPEG 2, MPEG 4, and MPEG 7 file formats) or other well-recognized video file formats, including motion JPEG, Quicktime and Video for Windows, for example. Transcriber logic 130 extracts portions of these stored video files on the DVR in various ways, including extracting multiple video frames, as shown in block 307, primarily extracting an audio data stream, as shown in block 317, and extracting closed captions that may be found in the video file, as shown in block 327.

In one exemplary embodiment for processing the video, the transcriber logic 130 extracts multiple video frames (Block 307) and uses an image binarization algorithm to perform image binarization upon the extracted video frames from the DVR, as shown in block 310. The image binarization algorithm converts the extracted video files to black and white images. After image binarization, the transcriber logic 130 employs an OCR algorithm to analyze the black and white images, as shown in block 311. The OCR algorithm electronically converts scanned or photographed images of typewritten or printed text into machine-encoded/computer-readable text. In this regard, the OCR algorithm searches for a speaker's name that may have been appended to the video image or that may be in a text transcript for the video. Upon finding the name, the transcriber logic 130 deems that the found name identifies the speaker who is talking when the name appears in the video. For example, in the case of a news story recited by a news anchor or reporter, the reporter's name may be appear in the video (e.g., at the bottom of the image). Also, the name of an individual being interviewed may similarly appear in the video. Accordingly, the transcriber logic 130 by employing the OCR algorithm is able to produce a speaker's name from extracted video frames.

The transcriber logic 130 may implement multiple image processing algorithms in order to convert color video images to black and white images, i.e. image binarization. These image binarization algorithms may be implemented simultaneously or sequentially. For example, one algorithm may initially convert the color image to a grayscale image, which has multiple shadings between the extreme end points of black and white. Afterwards, specific image processing edge operators for finding edges in images are applied, such as 3×3 Sobel edge operators that include diagonals and terms for finding corners and detecting edges. The density of the found edges is calculated and compared to a predetermined threshold to determine whether any text appears in the image.

Additionally, the transcriber logic 130 identifies bounding rectangles within the extracted video frame. Bounding rectangles encompass an object, a feature or group of features or an area of interest. One or more sides of the bounding rectangle will touch the object, for example. The bounding rectangles are defined by minimum and maximum coordinates in the x and y directions and are used to represent, in a general way, the location of a particular area. Nearby or proximate rectangles are merged by the transcriber logic 130, which also deletes smaller rectangles. The rectangles are assessed for their color content using, for example, a color bin having 16 colors. The most common color for each rectangle is found in this manner. Specifically, the transcriber logic 130 instructs every color that is within a bin of the most common bin be set to "white." The transcriber logic 130 also instructs that every other color is subsequently set to "black" in order to complete the image binarization, thereby forming black and white images. Such image binarization may facilitate identification of text using OCR.

The transcriber logic 130 may also comprise a second image processing algorithm that operates on video containing complex color schemes and increased resolution as that found in high definition video imaging. In one embodiment, the transcriber logic 130 matches each color frame to an existing template in order to find known regions of text within the image. In this regard, the template includes specific thresholds of background colors from a range of established colors. The color thresholds may be specific to certain television shows and graphics. As such, an automated program may count and compare the background colors against the color threshold. The graphics found in the images are further analyzed by the transcriber logic 130 in order to recognize commonly appearing names and other content, such as story titles, for example, which may be subsequently used in combination with a confidence algorithm to correctly correlate the name to a speech segment within the video.

Other image processing algorithms may also be employed by transcriber logic 130 to separate textual content from video images. For example, in one embodiment, the transcriber logic 130 is configured to find foreground text as opposed to finding background colors, detailed above with respect to the second algorithm. The foreground text is analyzed subject to determining whether the text includes substantially similar colored pixels that are connected together. When the foreground text is found with reasonable confidence, it may be set to black by the image binarization algorithm. The other colors in the image, thereafter, may be set to white by the image binarization algorithm. As stated earlier, the transcriber logic 130 may comprise multiple image processing algorithms that are known to persons skilled in the art in order to enhance accuracy of finding text in video content and ultimately speaker's names that may be included in the text for subsequent identification and correlation with speech segments found in the video content.

In another embodiment, the transcriber logic 130 includes instructions to employ the OCR algorithm prior to any of the above described image binarization algorithms. The transcriber logic 130 instructs the OCR algorithm to operate directly on color or grayscale images within the extracted video frame. In some embodiments, the OCR algorithm can include an internal image binarization algorithm.

The transcriber logic 130 may use other techniques for identifying the speaker of a given speech segment within the video, in addition to or in lieu of the above described image binarization and OCR algorithms. In one embodiment, the transcriber logic 130 employs a facial recognition algorithm. In this regard, the transcriber logic 130 analyzes multiple video frames in succession in order to identify a speaker's face in a video frame and track the identified speaker's face across the multiple video frames. In order to accomplish this, the transcriber logic 130 instructs the facial detection algorithm to perform face detection and landmarking of facial features, as shown in block 312. That is, the transcriber logic 130 is configured to employ at least one facial detection algorithm in order to determine and recognize faces that are part of an image. The facial detection algorithm processes one or more video frames in order to detect a face within an image. Once the face detection algorithm detects a face, the detected face may be compared to existing databases of identified faces. In this regard, a face found in an image of a particular video frame may be considered recognizable when it is compared to and sufficiently matches a stored face in the database. The faces stored in one or more databases may include pre-trained faces and/or face templates that the face detection algorithm is configured to recognize, such as faces of celebrity and public persons/figures, for example. Additionally, the transcriber logic 130 uses the face detection algorithm to analyze landmark features associated with faces, such as eyes, nose, and mouth, for example. Therefore, the transcriber logic 130 compares facial features that are stored in a data structure, such as eyes, nose, and mouth, of one face to another face. The transcriber logic 130 assigns a facial identifier to each analyzed face.

Additionally, the transcriber logic 130 uses established measurements of facial features, such as eyes, pupils, irises, retinas, noses, mouth, facial bone structure, for example, to determine the presence of a face within an electronic image. In order to analyze an image of a person's mouth, the transcriber logic 130 may be configured to analyze lip contours and the height and width of an identifiable mouth in an image. In one exemplary embodiment, when the transcriber logic 130 identifies the same face in successive frames, the logic 130 determines the extent to which the vertical component of the mouth in the particular image dynamically changes from frame-to-frame.

When the transcriber logic 130 determines that an identifiable position or point of a mouth within an image has dynamically changed, the mouth is considered to have moved. If the mouth is determined to have moved by more than a threshold amount from one frame to at least one other frame in a short time period, the transcriber logic 130 determines that the identified person is speaking in the video. The transcriber logic 130 timestamps the video in which the mouth of the detected face appears to move and thereby speak during the speech segment. Furthermore, the transcriber logic 130 correlates the times attributed to a detected speaker speaking with timed speech segments within the video. In one exemplary embodiment, the transcriber logic 130 assigns an identifier to the detected face. The identifier may be a number, a label, a name, or some other characterization for identifying and tracking the detected face across multiple video frames. As such, when the transcriber logic 130 identifies the detected face by number, the number of the face with the mouth that dynamically changes its vertical size the most may be determined as a speaking face. In this regard, the transcriber logic 130 also identifies the speaker by number, as shown in block 313. When the transcriber logic 130 has identified a face deemed to be speaking during a given time period, the logic 130 attributes each speech segment that occurs during such time period to the person correlated with the speaking face. Thus, each such speech segment in the transcript 136 is marked with the identity of the person correlated with the speaking face.

In the instant exemplary embodiment, the transcriber logic 130 tracks the detected face across multiple video frames. In order to accomplish this, the face detection algorithm uses a facial clustering methodology that identifies the same person's face from a cluster, aggregation, or group of faces that are similar in shape and structure. Those skilled in the art know that clustering in this manner is complicated because one single detected face may have many different facial poses at several different angles. In short, a typical detected face is not always captured, recorded and viewed as a full frontal perspective within the video. The face clustering algorithm is designed to connect the multiple facial poses to the same person. An example of how the face clustering algorithm, employed by the transcriber logic 130 for identifying a speaker and subsequently correlating the speaker to a speech segment, uses a facial template with known faces corresponding multiple facial poses for each known face is described below.

The transcriber logic 130 can be configured to operate on multiple facial data points found in images that are correlated with one or more video frames. Thus, the transcriber logic 130 may determine one particular face from analyzing many facial poses that the face clustering algorithm aggregated or clustered together, as shown in block 314. As stated above, the face clustering algorithm clusters or groups together multiple faces because of their similar facial features. Accordingly, in one exemplary embodiment, the transcriber logic 130 clusters similar faces, based on, for example, the measurement distance of specific data points for one or more predetermined facial features, such as eyes, nose, and mouth. A greater detailed description of measuring data points for facial features follows.

Transcriber logic 130 uses sample face templates for subsequent facial matching operations. Notably, one person's face detected from the video frame, for example, may be recorded or captured in multiple facial poses, including, for example, a left side facial pose, a right side facial pose, a 10 degree downward angular tilted facial pose, a 25 degree upward angular tilted facial pose, and a full frontal face pose. For each pose, a predetermined number of face templates are stored in a database for subsequent comparative analysis by the transcriber logic 130. In one working example, a single individual's detected face has 10 known sample face templates for each facial pose, as determined by the transcriber logic 130 as necessary to provide enough measurable facial data points. Given that individual facial poses of the same person may comprise different angles, the transcriber logic 130 is designed to connect the different facial poses to the same face or person. Because the face detection algorithm described above detects all faces in a particular video frame, the transcriber logic 130 creates a template for each detected face, referred to herein as a video frame template.

The transcriber logic 130 uses the video frame template to test against the known stored face templates. In this regard, the transcriber logic 130 includes a template matching function that assigns a value for a match and/or a non-match when a face from the video frame template is compared with a known face from the sample face template, described above.

In one example embodiment, the transcriber logic 130 uses facial poses of the same individual that reside in a database or table for subsequent comparison to known sample faces and facial poses. The transcriber logic 130 deems all of these facial poses as "connected" to the same individual. In one embodiment, the transcriber logic 130 employs a similarity value that lies between 0 and 1 when comparing the video frame template against all stored face templates for each facial pose. The transcriber logic 130 may add a new facial pose to the video frame's template, if the comparison yields no substantial match above a predetermined threshold. If the comparison does yield a substantial match above the predetermined threshold, the transcriber logic 130 determines whether to store the matched video frame template with the previously stored sample face templates, based on the number of existing stored face templates for the specific facial pose.

Using the example above of using 10 stored sample face templates for each facial pose, if there is a match above a threshold and there are less than 10 templates of the facial pose, the matched video frame template is added to the stored face templates. Conversely, if there are already 10 templates for a specific facial pose, the transcriber logic 130 determines the stored template of the facial pose with the maximum similarity. If the similarity is above a threshold amount, the transcriber logic 130 determines there is a match.

The generated face templates may also be represented as a bitstream for describing one or more faces, such as a 16 Kbyte bitstream, in one working example employed herein. As such, conventional image processing methodologies for constructing image processing templates may be employed, including, for example, constructing grids, using image textures and/or grayscale to evaluate image pixel values between 0-255.

In some embodiments and for certain poses, the transcriber logic 130 replaces the stored sample face template with the video frame's template. For example, when the video frame's template is less similar to the other templates in the pose, the transcriber logic 130 may replace the stored face template for that pose. Optionally, when the transcriber logic 130 adds a video frame template to a pose with an existing number of stored face templates, the two most similar templates may be identified. Thereafter, the transcriber logic 130 selects only one to remain as part of the stored face templates. Accordingly, where 10 stored face templates, for example, are deemed sufficient, only 10 stored face templates remain.

In order to track and analyze identifiable faces across multiple video frames, the transcriber logic 130 determines whether the background or scene in the video images has changed. Such information may be useful in identifying faces or determining a confidence of identified faces. In this regard, if the background remains similar from one frame to the next, then it is more likely that the frames include the same faces. Alternatively, a significant change in background implies that a new perspective is being shown, and it is therefore less likely that the same faces will be in the frames having the new background.

In order to detect scene changes, the transcriber logic 130 creates a histogram of red, blue, and green (RGB) pixels. In one embodiment, RGB histograms are created between video frames and any difference between the RGB histograms can be compared using conventional techniques and predetermined thresholds. For example, the transcriber logic 130 computes the chi square difference between RGB histograms and compares the result to a predetermined threshold value. If the chi square difference is below the threshold value, then the transcriber logic 130 determines that the scene has remained substantially the same. By gaining a measure of confidence about a particular scene, the transcriber logic 130 can compare different facial poses that appear in the same coordinate position of an image and determine whether the different facial poses are from the same individual. In this regard, when different facial poses appear in, for example, the same x, y coordinate location of a scene, the transcriber logic 130 considers (with greater confidence) the facial poses to be connected to the same individual. Transcriber logic 130, furthermore, constructs a list of the connected poses and stores the list of the connected poses in memory 120.

In another embodiment for verifying that a scene within a particular video frame has not changed, the transcriber logic 130 employs a scene change detector algorithm that parses a video frame into a grid pattern and then applies a computation and threshold comparison for each cell in the grid. When the transcriber logic 130 assesses the grid pattern, it may determine whether a minimum threshold number of cells have changed in order to assess an overall scene change, and thereby saving computation resources and improving reliability of the scene detector algorithm when only part of the video frame changes. Other mathematical computational techniques may or may not require RGB histograms to analyze scene changes in video frames.

Names can be attributed to the faces detected by the above described methodologies. In an exemplary facial recognition algorithm, the transcriber logic 130 attempts to identify the same face in different video frames. Thus, the transcriber logic 130 constructs one or more facial pose lists 400 (FIG. 4) that include the assigned facial identifier for each face found in each video frame. The facial pose list 400 may indicate, for each frame, the location of each identified face within the frame or otherwise point to imagery data defining the faces in each frame. Using the list 400, the transcriber logic 130 can determine when frames have the same faces and then compare the same face of a given speaker in multiple frames in order determine whether such speaker is talking. In this regard, the transcriber logic 130 locates the mouth of an identified face and determines the extent to which the mouth of this face changes from one frame to another. The greater the extent to which the mouth changes, the more likely it is that that the associated speaker is talking. If the speaker of an identified face is deemed to be talking, then the transcriber logic 130 attributes speech segments occurring between the two frames to such speaker.

Note that there are various techniques that can be used to analyze the mouth of an identified face in order to determine whether the associated speaker is talking. In one exemplary embodiment, the transcriber logic 130 is configured to measure vertical mouth dimensions for each facial pose over multiple frames. The multiple frames may have been previously stored, but could also be assessed in real time as well. Accordingly, for each facial pose the transcriber logic 130 uses multiple previous video frames to determine mouth dimensions for the facial pose, including lip contour dimensions and vertical dimensions for the mouth, for example. If the transcriber logic 130, for example, determines that a couple of facial poses, for example, are connected to the same individual, then the oldest pose's vertical mouth dimension is copied and correlated to the newest or most recent facial pose. Subsequent matching analysis performed on the facial poses, by transcriber logic 130 in each video frame, may yield a particular face pose having more average change in vertical mouth dimensions than others. In one working example, the transcriber logic 130 deems this particular face pose as the talking face in the image. Other embodiments may employ additional considerations for the face poses, including open and closed mouth analysis and the rate at which the mouths transition from open to closed, for example, in order to identify which face is talking.

For one example embodiment, the transcriber logic 130 determines whether any of the facial poses in the constructed pose list are connected with each other. In this regard, the transcriber logic 130 assigns each pose in the pose list an arbitrary identifier, such as a number, hereafter termed the "pose number." Where it can be found that some poses do connect or are correlated to an individual face, then a relationship exists between the connecting facial poses and thereafter may be referred to as "connected" to the other pose number. For example, FIG. 4 depicts a facial pose list 400 containing a pose number 40 that is connected to pose number 56 for face 1. In addition, pose number 50 is connected to pose number 24 for face 1. Regarding face 2, pose number 7 is connected to pose number 48. Pose numbers 24 and 7 are the lowest connected pose numbers for their individual faces of 1 and 2, respectively. The connected pose numbers may be stored in memory 120 along with the connected poses. In this regard, transcriber logic 130 constructs a connected pose list 400 and stores it in memory 120. The connected pose list 400 may be searchable by the logic 130 in performing a facial recognition algorithm. That is, for every pose, the connected pose list 400 may be searched. Also shown in FIG. 4 is an unconnected pose, pose number 33 for face 3. Transcriber logic 130 may include at least one recursive algorithm to search through the connected pose list in order to find the lowest connected pose number. Therefore, every new pose in the list can be assessed for its relative pose number compared to the other connected pose in order to find the lowest pose number between the two connected poses, i.e., the "lowest connected pose number." This process may be repeated, until all connected pose numbers have been determined, i.e., no new connected numbers are found in the list. If the pose number is found by the searching process, then the lowest connected pose number may be stored along with the pose. In this regard, the lowest connected pose is assigned to each pose. The lowest connected pose number, therefore, is the number used to cluster different facial poses of the same individual. Accordingly, in one or more embodiments, the transcriber logic 130 recognizes and identifies the same individual throughout multiple video frames (i.e., during video streaming, for example) by either a number, when clusters of faces are used, or as an assigned name, when such name is known, or by other identifiers as well.

Transcriber logic 130 extracts one or more audio streams, as shown in block 317. Thereafter, the transcriber logic 130 employs a speaker diarization algorithm to determine the identity of the speaker, according to a speaker's number, assigned arbitrarily by the speaker diarization algorithm, as shown in block 319. In this regard, transcriber logic 130 extracts an audio file, such as a WAV file, or a MPEG 2 file, from a video file, for example. The transcriber logic 130 may subsequently associate the speaker number with a name, based on results from other algorithms described herein.

The speaker diarization algorithm comprises multiple logical operations. For example, the speaker diarization algorithm analyzes the audio to extract and cluster audio features. Thereby, the speaker diarization algorithm identifies the speech segments where the same person speaks repeatedly. In addition, the speaker diarization algorithm analyzes the transition of speakers per speech segment, based on matching timestamps to speech text contained in a closed captioning transcript. The transcriber logic 130 causes the speaker diarization algorithm to append a time to a speech segment and thereafter use the results from above that identified a speaker and correlated speaking time to match the speaking segment with the speaker and track the transition of the speaker with respect to the matched speech segment.

In one exemplary embodiment, the transcriber logic 130 uses existing audio segments that are known to contain identified speakers and are stored as templates for training the speaker diarization algorithm in order to quickly identify a particular speaker for subsequent correlation with a speech segment. As stated above, the transcriber logic 130 may use results from the facial recognition algorithm, and specifically a facial pose number that has been identified as a speaker when correlating and matching timestamps with a speech segment in a video frame. This process is termed herein as "speaker diarization." In this regard, the collective output from algorithms employed by the transcriber logic 130, including but not limited to face detection algorithm, speaking recognition algorithm, and face clustering algorithm is used to provide a facial pose number. The most common facial pose number associated for each speaker number may, therefore, be used to identify the person who is most likely speaking. Thereafter, speaking segments of the video may be matched to speaker transitions. In one example embodiment, the transcriber logic 130 processes a WAV file and identifies whenever the same speaker is speaking throughout the audio file. The output from the speaker diarization algorithm may be a text file having a speaker number for every segment of time that the same speaker is speaking. Thereafter, the transcriber logic 130 converts identifiers such as speaker numbers to speaker names using information from a provided closed caption transcript. In this regard, for each speaker transition shown in the closed caption transcript, the transcriber logic 130 identifies the speaker number by matching timestamps associated with a speaker name to a speaking segment found in the closed caption transcript.

Specifically, the transcriber logic 130 matches speaker numbers and pose numbers to speaker names by using video frames every N-frames; for example, every 30 frames. When the transcriber logic 130 converts frame numbers to a time segment, names are thereafter matched to speaking segments and speaker transitions within a speaking segment. In one example embodiment, the transcriber logic 130 compares pixels in each video frame, after image binarization, to determine whether any of the pixels have changed, and thus whether the video frame is substantially the same. If less than a predetermined number of pixels change, then the frame is not further processed by the transcriber logic 130, because the video frame has not substantially changed and the speakers have been previously identified by one of the methods described above.

Speaker names can be identified, because transcriber logic 130 (Block 311) evaluates text according to speech parsing and name entity recognition. Conventional natural language processing (NLP), which employs statistical tools for solving computational linguistic problems, may be used as part of transcriber logic 130 to evaluate the text. The transcriber logic 130 is further configured to distinguish and identify text correlated to a person and text correlated to a story heading, for example. The transcriber logic 130 may also use an additional source of names different than that used by the conventional NLP technique. Thereafter, the transcriber logic 130 outputs a text file with a speaker number for every segment of time that the same speaker speaks. In one embodiment, each speaker number may be comprised of a multi-dimensional feature vector, which can be used to match the same speaker in different audio files. Moreover, the transcriber logic 130 uses data outputted from other algorithmic operations depicted in the data flow diagram 300, for example, as an input or a starting point. For example, with regard to FIG. 3 and flow diagram 300, output from at least one of the face detection module 312, the speaking recognition module 313, and the clustering module 314 is inputted to the speaker diarization module 319.

In order to improve upon identifying a speaker and thereafter correlate the identified speaker with a speech segment, the transcriber logic 130 extracts a third source of information or data from the stored video frames, i.e. closed captions of conversations occurring in the video, as shown in block 327. Hence, the transcriber logic 130 extracts the closed caption transcript from the video file, wherein the closed caption is encoded with the video data. Such transcript may include speaker transitions marked with symbolic prompts, such as ">>" and also segment timing information that measures the duration of sentence segment within a closed caption transcript. The segment timing information is useful for matching the time that a speaker spoke with the one or more closed caption transcripts. For one example embodiment, the transcriber logic 130 examines the closed captions transcript by using parsing rules to gain hints about who is speaking. The parsing rules employed in the transcriber logic 130 identify commonly-used text, which appears near a person's name, which when associated with contextual content, indicates the current speaker, the previous speaker, and the next speaker. For example, the closed caption transcript may include the following: "I'm Dan Simon." In such context, Dan Simon is likely speaking. In other examples, the closed caption transcript may include the following: "Dan, thank you for your thoughts" or "What do you think, Dan?" In such context, the next spoken words are likely to be spoken by Dan. In an alternative embodiment, the transcriber logic 130 assigns each sentence segment to an identified speaker and/or detect a speaker change per sentence segment or transcript line. In this regard, each sentence segment comprises an arbitrary number of characters and expected time duration. For example, one sentence segment may comprise 40 characters and have time duration of five seconds, while another sentence segment may have fewer characters, i.e., 32 characters and yet have time duration of eight seconds. Other sentence segment or transcript line structures are possible and contemplated herein.

Accordingly, the transcriber logic 130 assigns each predetermined sentence segment or transcription line to a particular speaker. In one embodiment, a timestamp is added to the speaker assignment by the transcriber logic 130 in order to determine a correlation or match with a speech segment found in the closed caption transcript, thereby forming a confidence that the identified speaker spoke the words written in the transcript.

The transcriber logic 130 (FIG. 1) uses combinations of sets of algorithms, described earlier above, and stored in memory 120 for extracting and processing different sources of information, including video frames, audio streams, and closed captions. In this regard, the transcriber logic 130 examines the transcript for the speaker's name, because in the case of a news interview, the speaker's name is often introduced by the news anchor at the start of an interview. The transcriber logic 130 may also be configured to match the number of a speaker identified from speaker diarization algorithm to a name from OCR algorithm or the closed caption output extracted by transcriber logic 130.

The transcriber logic 130, as shown in block 330 of FIG. 3, employs machine learning algorithms to determine the start and end time of each transcribed story. The transcriber logic 130 combines results from multiple algorithms to arrive at a mathematical estimation on the identity of the speaker at a specific prompt within the transcription. The mathematical estimation may include a confidence value associated with accuracy of the speaker identified as spoken the words within a speech segment of the video as recorded by a corresponding closed caption transcript. In addition, the transcriber logic 130 may combine the mathematical estimation reflecting the accuracy of the identified speaker with a historical accuracy component and other separate, but additional factors. Estimation methodologies may further comprise employing weighted majority voting, neural nets, and Bayesian probability techniques that improve accuracy regarding the likely speaker. In one embodiment, for greater accuracy, the transcriber logic 130 comprises a predetermined threshold value as a measure for accurately identifying a speaker at specified transcription prompts within a previous closed caption transcript of a television news show, for example, to form a new readable transcript 136. Accordingly, the transcriber logic 130 provides a readable transcript 136 having identified speakers throughout the transcript 136, based on the above described embodiments herein. The transcript 136 is also stored in the memory 120. Each set of generated transcript data is a textual file that indicates and identifies each speaker per sentence segment. The transcript 136 can thereafter be searched and will therefore be able to reveal the speaker associated with the written word.

Other forms of textual content may also be derived by the above described methods including outlines and summaries. Transcriber logic 130 constructs a summary of the spoken conversation that ensures that each speaker is represented, but also enables shifting of the textual content for the identified relevant speaker at any moment in time, thereby capturing relevant spoken content, even if the identified relevant speaker's proportional contribution is minimal or less than other speakers' contribution. The speaker tracking may be accomplished by employing conventional text summarization algorithms in combination with the transcriber logic 130. In addition, the transcriber logic 130 includes timelines that reflect the initiation, duration, and cessation of the textual content and one or more speaker's spoken contributions within a specified timeline.

Aggregated textual content in the form of outlines, summaries, or substantially full transcripts may be tracked by transcriber logic 130 to determine positive and negative mentions of companies, people, products, topics and categories, and entertainment vehicles such as games, television, movies, and sports for example. In one embodiment, the transcriber logic 130 may use name and/or entity recognition and statistical analysis around surrounding word content count, for example. In another embodiment, the transcriber logic 130 tracks the relevant mentions described above and updates them, based on counts. Any associated ratings may be used to rank the company or person, for example, during a search query. In this regard, the transcriber logic 130 generates a selected summary according to the number of times an article is mentioned or television ratings of a particular show, for example. Additionally, the transcriber logic 130 modifies the aggregated textual content to include hyperlinks to other textual summaries and web videos, for example. In one embodiment, the transcriber logic 130 uses the included hyperlinks to create one or more websites that are comprised of links to summaries and outlines of the video content and that are organized according to the video content, for example, wherein the video content is television news, the website may be organized by television shows, television channels, new categories, and/or news topics.

In one example embodiment, the transcriber logic 130 is configured to identify and mark commercials (block 333 of FIG. 3) in the video and to omit speech from the commercial in the transcript 136 that is being defined. Note that there are various techniques that can be used to identify commercials. As an example, the closed captioning associated with the video may include information indicating commercials within the video. In addition, the transcriber logic 130 may analyze the image data to determine when the scene changes in a material way to suggest that a commercial is occurring. As an example, significant changes in the video's background may indicate that a transition to a commercial has occurred. In addition, text being displayed in the video may suggest that a commercial is occurring. In one example embodiment, the transcriber logic 130 determines that a commercial is occurring when faces previously identified in the video are absent in the video for a period of time above a certain threshold, such as about ten or fifteen seconds. If a commercial is identified, the transcriber logic 130 may mark the beginning of the commercial at approximately the time that the identified faces disappeared from the video even though the commercial is not actually identified until a later point in the video. In some embodiments, the identification of a commercial is a multi-factor decision based on one or more of the considerations described above. In other embodiments, yet other techniques for identifying commercials within the video are possible.

Now, therefore, the following is claimed:

1. A method for transcribing video, comprising:
   receiving, by a computer-based system from a network, a video feed having video data, audio data, and closed-captioning data, the closed-captioning data indicative of speech defined by the audio data;
   identifying a speech segment within the closed-captioning data;
   automatically defining, by the computer-based system, a transcript of the speech based on the closed-captioning data in the video feed received from the network;
   automatically analyzing, by the computer-based system, the video data, audio data, and closed-captioning data by the computer-based system;
   automatically identifying, by the computer-based system, a speaker for the speech segment within the transcript based on the analyzing;
   automatically marking, by the computer-based system, the speech segment in the transcript with an identifier of the speaker thereby attributing the speech segment to the speaker;
   summarizing the transcript, wherein the summarizing comprises determining an overall percentage of speech attributable to the speaker for the closed-captioning data and selecting portions of the transcript for removal based on the determined overall percentage; and
   storing the transcript in memory.

2. The method of claim 1, wherein the analyzing comprises performing a voice recognition algorithm on the audio data.

3. The method of claim 1, wherein the analyzing comprises performing a facial recognition algorithm on the video data.

4. The method of claim 1, wherein the analyzing comprises:
   identifying a face within the video data;
   determining whether a mouth of the face is moving between video frames; and
   correlating the identifier with the face based on the determining.

5. The method of claim 1, wherein the analyzing comprises performing a speaker diarization algorithm on the audio data.

6. The method of claim 1, wherein the analyzing comprises performing an optical character recognition (OCR) algorithm on the video data.

7. The method of claim 1, wherein the analyzing comprises performing a plurality of identification algorithms for identifying the speaker, and wherein the method comprises:
   automatically assigning, by the computer-based system, a confidence value to each of the identification algorithms; and
   automatically selecting, by the computer-based system, at least one of the identification algorithms for use in the identifying the speaker based on the assigned confidence values.

8. The method of claim 1, further comprising automatically identifying, by the computer-based system, at least one commercial in the video feed, wherein the defining is based on the identifying the at least one commercial.

9. The method of claim 1, wherein the analyzing further comprises performing a plurality of identification algorithms for identifying the speaker, wherein the analyzing further comprises performing a machine-learning algorithm for use in identifying the speaker, and wherein a result for each of the plurality of identification algorithms is used in performing the machine-learning algorithm.

10. The method of claim 9, further comprising automatically assigning, by the computer-based system, a confidence value to each of the identification algorithms for use in identifying the speaker.

11. The method of claim 1, further comprising reading a name of a person from the video data using optical character recognition, wherein the identifying the speaker comprises identifying the person as the speaker based on the reading.

12. The method of claim 1, wherein the selecting is performed such that an overall percentage of speech attributable to the speaker for the transcript is kept within a predefined margin of the overall percentage of speech attributable to the speaker for the closed-captioning data.

13. A transcriber system, comprising:
a network interface for receiving a video feed from a network, the video feed having video data, audio data, and closed-captioning data, wherein the closed-captioning data is indicative of speech defined by the audio data;
memory; and
logic configured to define a transcript of the speech based on the closed-captioning data in the video feed received by the network interface, the logic configured to identify a speech segment within the closed-captioning data, the logic further configured to analyze the video feed and to identify a speaker for the speech segment within the transcript, wherein the logic is configured to mark the speech segment in the transcript with an identifier of the speaker thereby attributing the speech segment to the speaker, wherein the logic is configured to determine an overall percentage of speech attributable to the speaker for the closed-captioning data and to summarize the transcript by selecting portions of the transcript for removal based on the determined overall percentage, and wherein the logic is configured to store the transcript in the memory.

14. The system of claim 13, wherein the logic is configured to perform a voice recognition algorithm on the audio data, and wherein the logic is configured to identify the speaker based on the voice recognition algorithm.

15. The system of claim 13, wherein the logic is configured to perform a facial recognition algorithm on the video data, and wherein the logic is configured to identify the speaker based on the facial recognition algorithm.

16. The system of claim 13, wherein the logic is configured to identify a face within the video data and to make a determination whether a mouth of the face is moving between video frames, and wherein the logic is configured to identify the speaker based on the determination.

17. The system of claim 13, wherein the logic is configured to perform a speaker diarization algorithm on the audio data, and wherein the logic is configured to identify the speaker based on the speaker diarization algorithm.

18. The system of claim 13, wherein the logic is configured to perform an optical character recognition (OCR) algorithm on the video data, and wherein the logic is configured to identify the speaker based on the OCR algorithm.

19. The system of claim 13, wherein the logic is configured to perform a plurality of identification algorithms for identifying the speaker, wherein the logic is configured to assign a confidence value to each of the identification algorithms, and wherein the logic is configured to select at least one of the identification algorithms for use in the identifying the speaker based on the assigned confidence values.

20. The system of claim 13, wherein the logic is configured to identify at least one commercial in the video feed and to define the transcript based on the identified commercial such that the transcript omits at least one speech segment associated with the identified commercial.

21. The system of claim 13, wherein the logic is configured to perform a plurality of identification algorithms for identifying the speaker, and wherein the logic is configured to use a result for each of the plurality of identification algorithms in a machine-learning algorithm for identifying the speaker of the speech segment.

22. The system of claim 21, wherein the logic is configured to assign a confidence value to each of the identification algorithms for use by the machine-learning algorithm in identifying the speaker of the speech segment.

23. The system of claim 13, wherein the logic is configured to determine a speaker transition between consecutive speech segments in the transcript and to insert a speaker name into the transcript identifying the speaker of one of the consecutive speech segments.

24. The system of claim 13, wherein the logic is configured to select the portions of the transcript for removal such that an overall percentage of speech attributable to the speaker for the transcript is kept within a predefined margin of the overall percentage of speech attributable to the speaker for the closed-captioning data.

* * * * *